E. C. SMITH.
HAY LOADER.
APPLICATION FILED OCT. 30, 1916.

1,265,969.

Patented May 14, 1918.
6 SHEETS—SHEET 1.

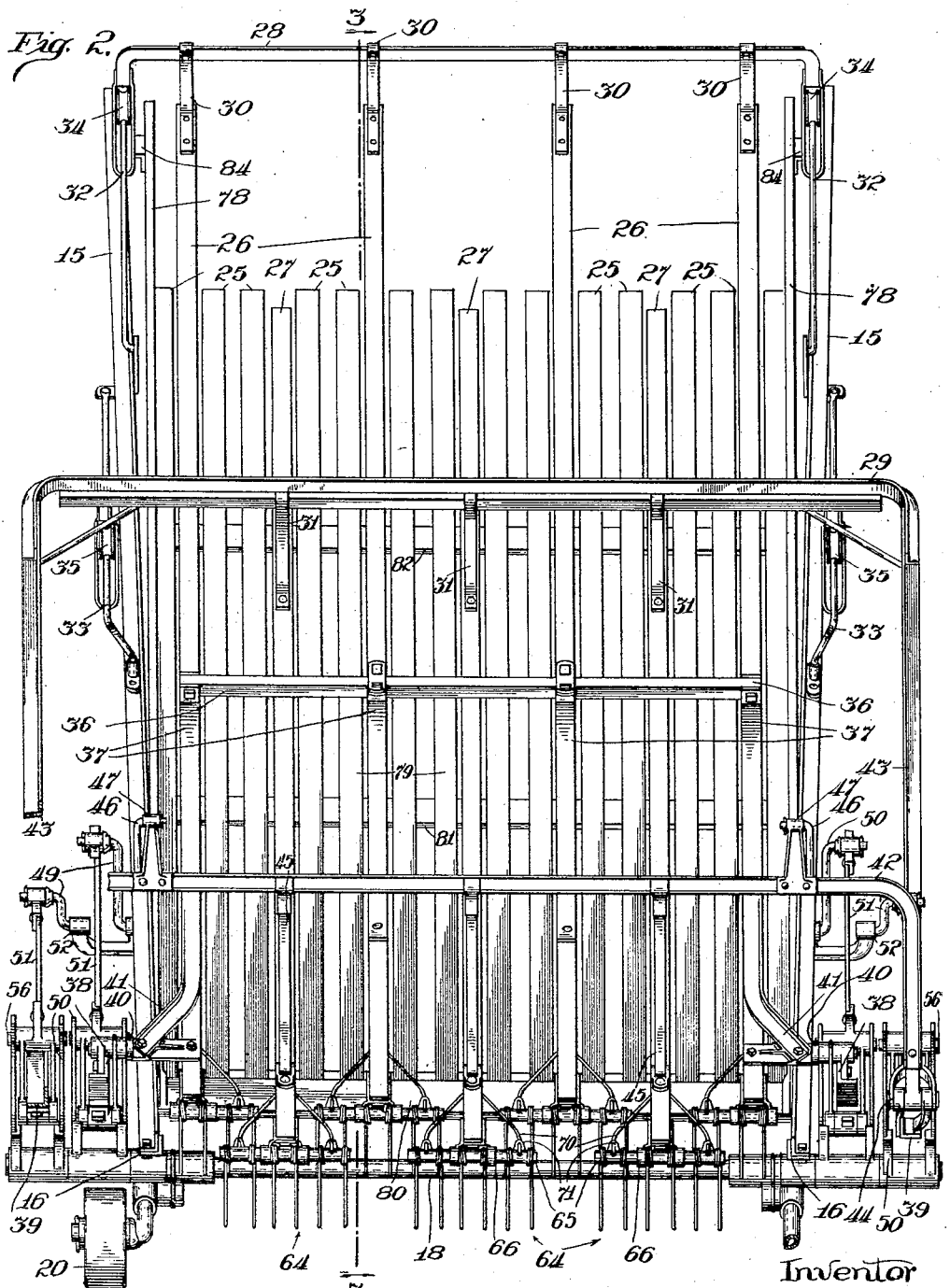

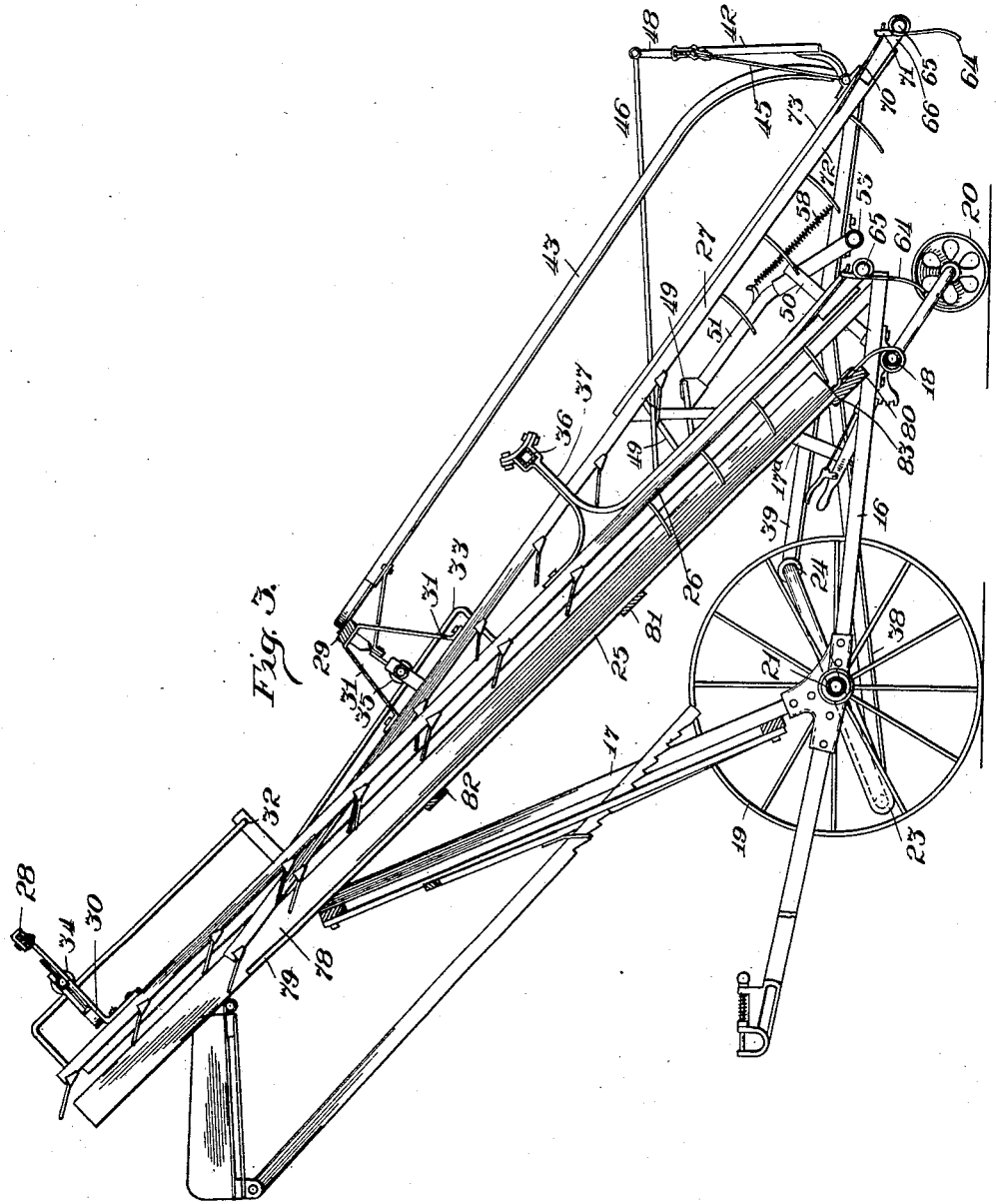

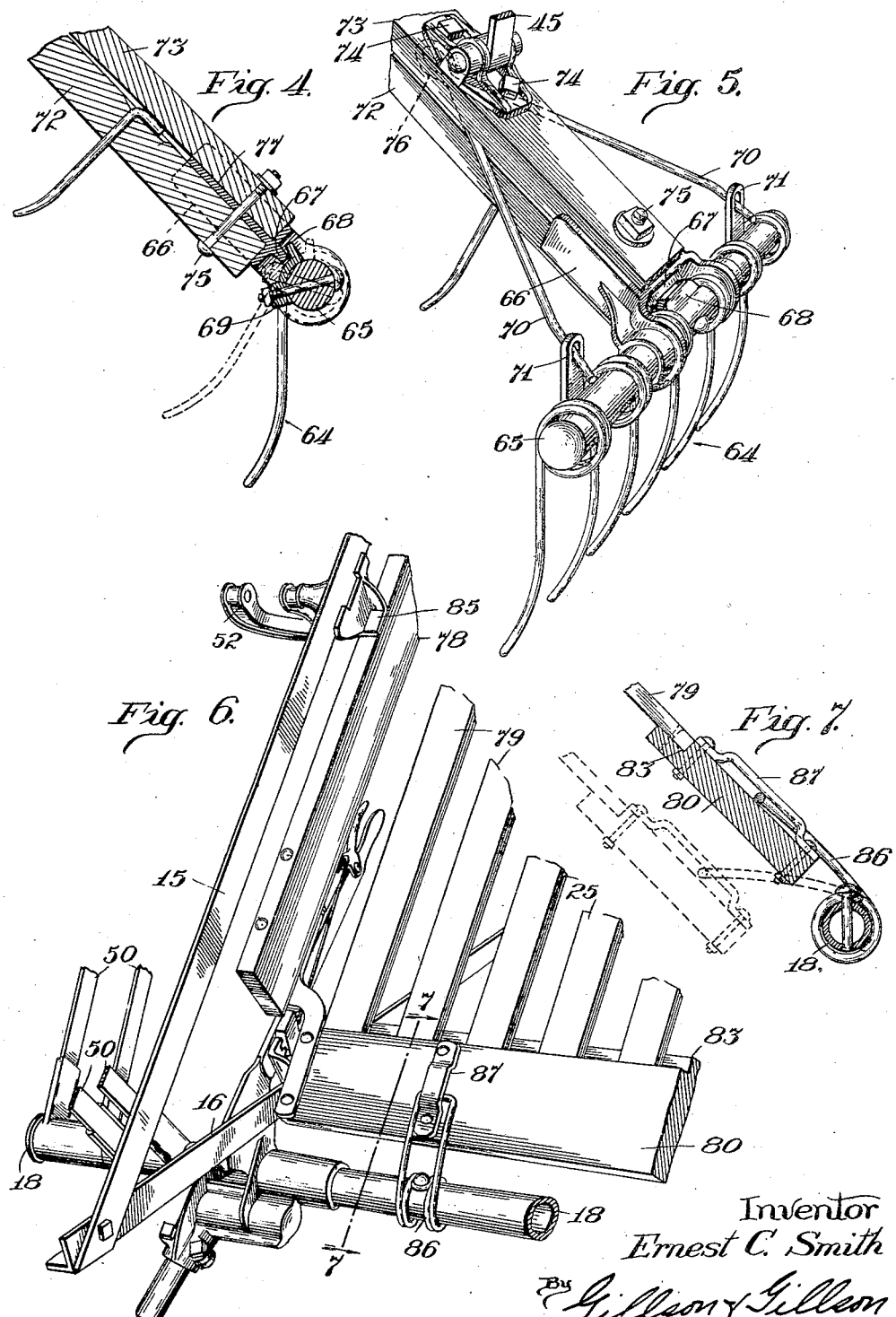
E. C. SMITH.
HAY LOADER.
APPLICATION FILED OCT. 30, 1916.
1,265,969.
Patented May 14, 1918.
6 SHEETS—SHEET 4.
Inventor
Ernest C. Smith
By Gillson & Gillson
Attorneys

E. C. SMITH.
HAY LOADER.
APPLICATION FILED OCT. 30, 1916.

1,265,969.

Patented May 14, 1918.
6 SHEETS—SHEET 5.

Inventor
Ernest C. Smith
By Gillson & Gillson
Attorneys

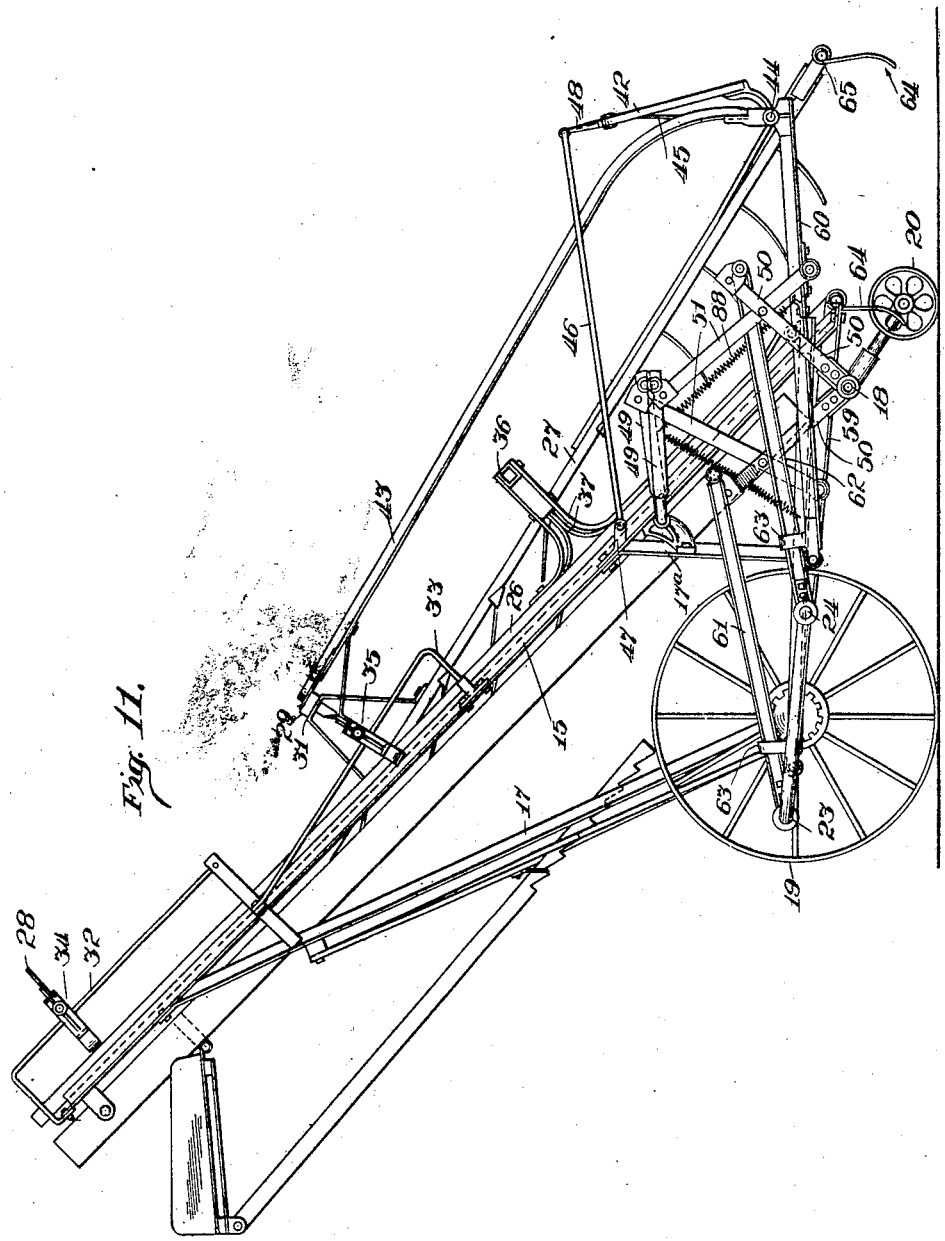

UNITED STATES PATENT OFFICE.

ERNEST C. SMITH, OF HOOSICK FALLS, NEW YORK, ASSIGNOR TO WALTER A. WOOD MOWING AND REAPING MACHINE CO., OF HOOSICK FALLS, NEW YORK, A CORPORATION OF NEW YORK.

HAY-LOADER.

1,265,969.  Specification of Letters Patent.  Patented May 14, 1918.

Application filed October 30, 1916. Serial No. 128,475.

*To all whom it may concern:*

Be it known that I, ERNEST C. SMITH, a citizen of the United States, and resident of Hoosick Falls, county of Rensselaer, State of New York, (his post-office address being Hoosick Falls, New York,) have invented certain new and useful Improvements in Hay-Loaders, of which the following is a specification, and which are illustrated in the accompanying drawings, forming a part thereof.

The invention relates to hay loaders and more particularly to those of the so-called walking rake type, although some of the features of improvements are also applicable to other forms of hay loaders. The object of the invention is to provide a hay loader of improved construction, and the invention contemplates novel mechanism for actuating the rake bars to obtain an effective travel of said bars with a relatively short driving crank. Other improvements relate to the mounting of the gathering rakes and the deck, the latter being designed to maintain an effective operation of the machine in both light and heavy hay.

In the accompanying drawings Figure 1 is a side elevation of the improved hay loader embodying one form of the novel mechanism for actuating the rake bars.

Fig. 2 is a rear elevation of the same, some of the parts being shown in section on the plane indicated by the line 2—2 on Fig. 1;

Fig. 3 is a longitudinal sectional view, the plane of section being indicated by the line 3—3 on Fig. 2;

Fig. 4 is a detail central sectional view of one of the rake bars;

Fig. 5 is a perspective view of the parts shown in Fig. 4;

Fig. 6 is a detail perspective view showing the lower end of the deck and the frame parts adjacent thereto at one side of the machine;

Fig. 7 is a detail sectional view taken on the line 7—7 of Fig. 6 with a different position of the deck shown by dotted lines;

Figure 1:
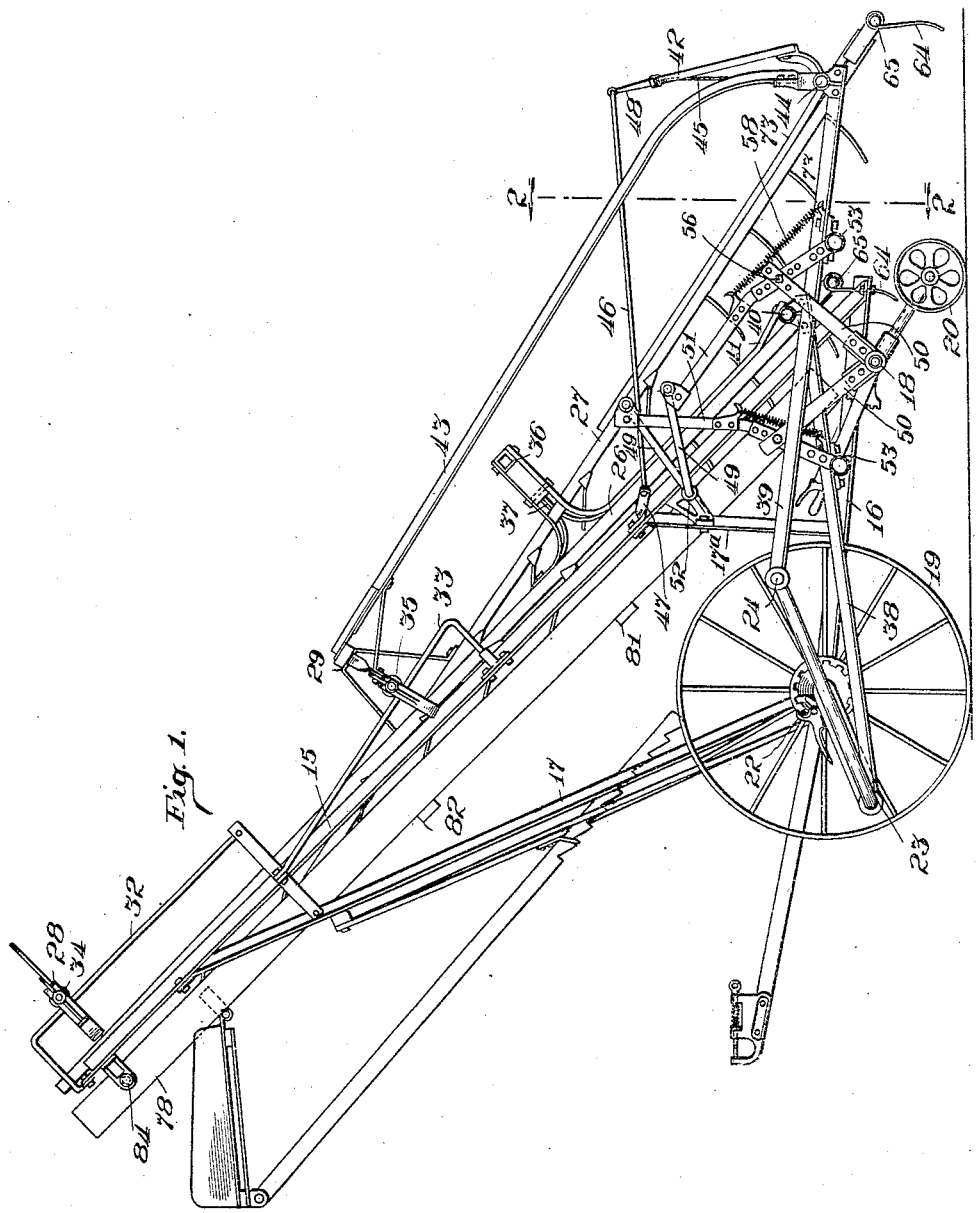
Figure 8:
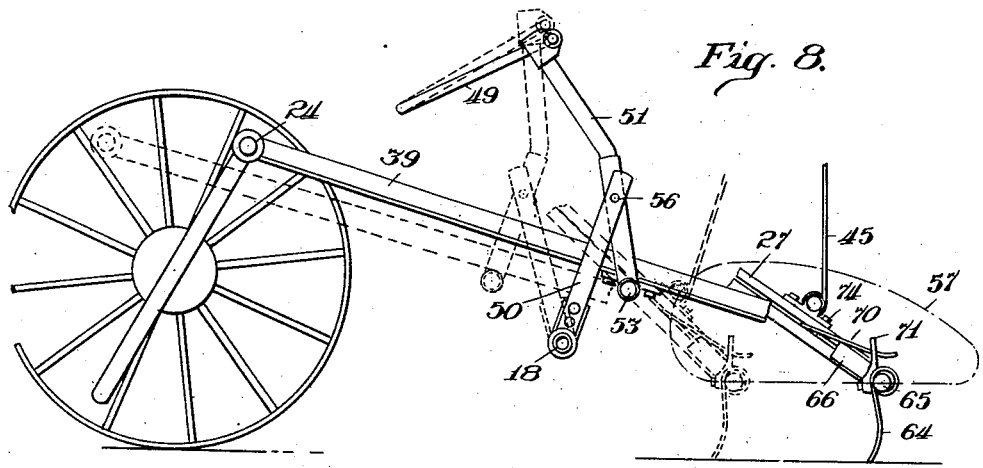
Figure 9:
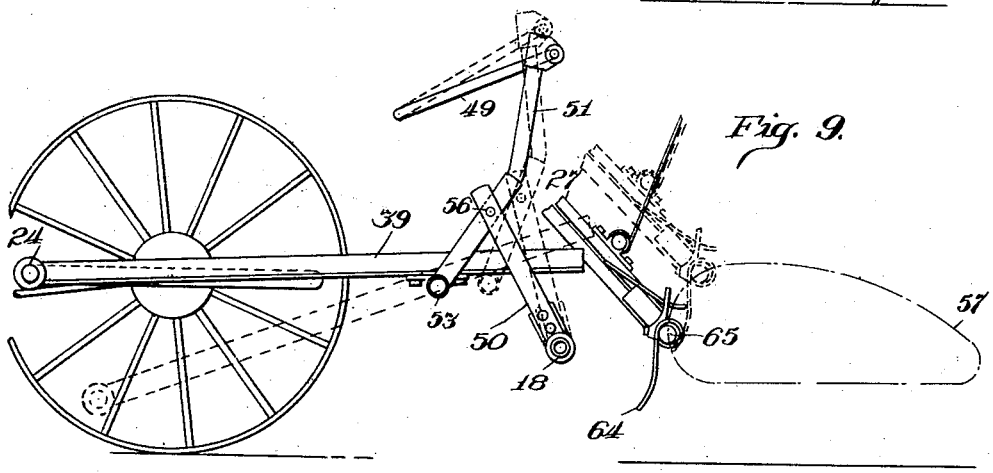
Figure 10:
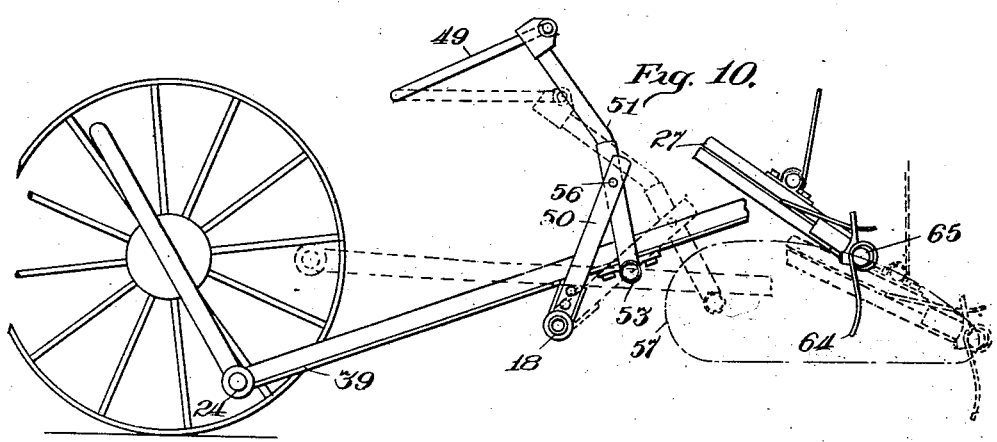

Figs. 8, 9 and 10 are detail side views showing principal elements of the mechanism for actuating the rake bars of one set, the parts being shown in different positions in the several views with a second position of the parts shown by dotted lines and the path of movement of one of the rake bars shown in diagram, in each of the said views; and Fig. 11 is similar to Fig. 1, but shows a modified form of the mechanism for actuating the rake bars.

The machines illustrated in the drawings include the usual wheeled frame. As shown this frame comprises the inclined side members 15, horizontal side members 16, uprights 17 and 17ª, cross rod 18, drive wheels 19 and caster wheels 20. The drive wheels 19 are located adjacent the opposite ends of a through axle, as 21, with which each of said wheels has a ratchet and pawl connection 22, and each end of the axle is constructed to provide the two diametrically opposed cranks 23—24 turning in different planes beyond the corresponding wheel. The hay is moved upwardly over the deck, as 25, by the operation of two sets of oscillating toothed bars, as 26—27.

The gathering of the hay is accomplished by a plurality of rakes 64, one of which is mounted at the lower end of each of the toothed bars, as 26—27. The bars, as 26—27, of the two sets, are arranged in alternation over the deck 25 and all of the bars of each set are rigidly connected at or near their upward ends. For this purpose a cross tie 28 or 29 and brackets 30 or 31 are employed. The cross ties 28 and 29 also serve for guidedly supporting the corresponding oscillating bars, as 26 or 27, during their movement. As shown, two guide rods 32—33 are mounted on the frame at each side of the machine, near the upper end of the deck 25, and trolleys 34 and 35 are provided at the opposite ends of the cross ties, 28 and 29 respectively for engagement with guide rods 32 or 33 at the corresponding side of the machine. A third cross tie 36 is employed for connecting the several oscillating bars, as 26, of one set, intermediate their ends. To provide clearance for the oscillating bars, as 27, of the other set, below the cross tie 36, this cross tie is supported at a substantial distance above the plane of the bars 26 by a plurality of standards 37, one of which is associated with each of the said bars 26.

In the form of construction which is more particularly illustrated in Figs. 1 to 3 and in Figs. 8, 9 and 10, the mechanism for actuating the oscillating bars, as 26 or 27, of each set, includes a link 38 or 39 at each side of the machine. These links are each connected at one end with one of the cranks 23 or 24 at the corresponding side of the machine. The other end of each link 38 is directly connected with the nearest oscillating bar 26 at the same side of the machine. For this purpose a trunnion 40, (Fig. 2) is applied to the outermost oscillating bar 26 at each side of the machine and the bases of the corresponding standards 37 are extended downwardly over the said outermost bars 26, and are turned outwardly at their lower ends, as at 41, to form braces for the said trunnions.

As the connections between the links 39 and the oscillating bars 27 must clear the parts connecting the links 38 with the bars 26, separate members, as 42 and 43, are desirably employed for transmitting the longitudinal and the rising and falling movements to the bars 27 and these members are each so formed as to arch over the links 38, bars 26 and the connections between said parts. As shown, the members 42 and 43 take the form of U-shaped frames, which extend transversely over the machine and the two ends of both of these frames are pivotally connected with the ends of the links 39 at the two sides of the machine, as at 44 (Fig. 1). Guide links 46 serve for maintaining the U-shaped frame 42 substantially upright and each of the oscillating bars 27 is suspended from the cross piece of this U-shaped frame, as by a strap 45. The guide links 46 are preferably located adjacent opposite sides of machine. As shown each of these guide links extends between a fixed bracket 47, mounted on the corresponding frame member 15, and an arm 48 which rises from the cross piece of U-shaped frame 42 and is rigidly attached thereto. The U-shaped frame 43 extends forwardly over the machine and has its cross piece applied to and firmly connected with the cross tie 29.

In the form of construction illustrated in Figs. 1 to 3 and in Figs. 8, 9 and 10 a pair of crank arms 49 and 50 and an intermediate link 51 serve for modifying the movement of each of the links 38 and 39 to obtain the desired movement of the oscillating bars 26, 27 and rakes 64. As shown, the crank arms 49 and 50 of each set swing upon fixed centers which are located above and below the corresponding link 38 or 39, respectively, and they are connected by the corresponding link 51 in such manner that the crank arm 50 crosses the corresponding link 38 or 39. The link 51 also extends beyond the crank arm 50 and has a pivotal connection with the corresponding link 38 or 39, as at 53. The cross rod 18 of the frame conveniently serves as the pivotal support for the two crank arms 50 at each side of the machine. The two crank arms 49, at each side of the machine, on the other hand, have alined pivotal bearings in a bracket piece 52 provided for the purpose. As shown, this bracket piece is supported in fixed position by being secured against the upright and inclined frame members 17ª and 15 in the angle between said frame members.

The arrangement just described provides that the several oscillating bars, as 26 and 27, of each set, have a substantial straight horizontal forward movement at their lower ends sufficiently in excess of the throw of the corresponding crank arm 23 or 24 to exceed the forward travel of the machine during such movement. It, therefore, follows that the strokes of the corresponding rakes 64 overlap and a clean raking of the field is insured. The travel of the lower end of each of the bars 26—27 also comprises an abrupt upward movement at the end of its forward stroke, and a slightly inclined and somewhat curved receding movement with a sharp turn at the rear end of the stroke. This path of movement is indicated by the dot and dash line 57 on each of Figs. 8, 9 and 10.

Since the forward travel of each rake 64 over the ground requires a greater application of power than is required for the return travel of the rake, while the upward movement of the rakes associated with the bars 26 or 27 of one set, begins before the return movement of the rakes associated with the bars of the other set has been completed, springs, as 58, may be employed for rendering the application of power more uniform. Preferably one of the springs 58 is associated with the mechanism for actuating the oscillating bars 26—27 of each set at both sides of the machine. As shown, each spring 58 is extended between an intermediate part of one of the links 51 and a part of the corresponding link 38 or 39 in rear of the connection 53 between such link and the link 51. This arrangement provides that each spring 58 is strained during the rising movement of the corresponding rakes 64, at which time the rakes of the other set are completing their return stroke. Under these circumstances the contraction of the springs 58 occurs during the engagement of the rake bars of the corresponding set with the ground and the springs assist in supplying power for the gathering of the hay upon the field.

In the form of construction illustrated in Fig. 11 the crank arms 49 and 50 and the links 51 are employed, but the links 38 and 39 are replaced by pitmen 59—60 and links 61 and 62. The pitmen 59—60 have their rear ends respectively attached to the trunnion 40 and to the ends of the U-shaped frames 42, 43 as at 44, in the same manner as the links 38, 39 shown in Figs. 1 to 3, but the other ends of the pitmen 59—60 are not directly connected with the cranks 23, 24. In this instance the links 61 and 62 are connected with the cranks 23 and 24 respectively and each of the pitmen 59 and 60 has a sliding connection with one of the links 61 and 62, as at 63. The links 61 and 62 are also connected with the corresponding crank arms 50 and these crank arms are each extended beyond the point of connection with the link 51 for that purpose.

The movement imparted to the oscillating bars 26—27 by the arrangement shown in Fig. 11 is the same as that obtained by the use of the mechanism illustrated in Figs. 1, 2 and 3 and Figs. 8, 9 and 10. However, the form of construction illustrated in Fig. 11 permits of the cranks 23 and 24 being somewhat shorter while still obtaining the same horizontal travel of the rakes 64 over the ground. It follows that while both forms of construction provide a sufficient length of horizontal travel of the rakes 64 to obtain an overlapping of the raking strokes and thus insure a clean raking of the field, the form of construction illustrated in Fig. 11 accomplishes this result with cranks 23 and 24 of such length as to be less likely to become engaged with obstructions in the field.

Each rake 64 is preferably mounted to fold forwardly during its return stroke in event it becomes engaged with the hay which at the moment is being advanced by the rake bars of the other set. As shown, the head 65 of each rake 64 takes the form of a transverse spindle and this spindle is journaled in the arms of a bifurcated bracket 66, which is applied to the lower end of the corresponding rake bar, as 27, (Figs. 4 and 5). A stud, 67, formed on the bracket 66 between its arms, enters the space between a pair of angular separated studs 68 and 69 mounted on the spindle 65 to limit the swinging movement of the rake 64 in both directions.

A spring 70 is employed for yieldingly resisting the folding movement of each rake 64 and for returning the rake to operative position after folding. Preferably this spring is constructed to also serve as a guard for preventing the accumulated hay from rising above the rake during its forward movement. As shown, the spring 70 is formed from a single elastic rod and the two ends of the rod are engaged with lugs 71 formed on the spindle 65 adjacent its opposite ends and in front of the axis of the folding movement of the rake. An intermediate part of the spring rod 70 has a fixed support upon the corresponding bar, as 27. In the construction illustrated each oscillating bar, as 27, is formed from a pair of superimposed members 72—73 and these members are connected at intervals by bolts, as 74 and 75. When the bar, as 27, is so made, the intermediate part of the spring rod 70 is formed into a loop 76 and this loop is located between the two members 72—73 of the bar with one of the connecting bolts, as 74, extended through the loop. In this instance the bracket 66 is formed with an intermediate web 77, which is also interposed between the two members 72—73 of the bar, as 27. The bracket 66 is firmly held in position upon the corresponding bar by extending another one of the said connecting bolts, as 75, through an aperture in the web 77.

As a further feature of improvement the deck 25 is mounted for yielding movement at its lower end to permit the passage of large quantities of hay over the same. As shown, the said deck 25 takes the form of a rigid frame comprising longitudinal side members 78, a plurality of intermediate slats 79 and a series of cross member 80, 81 and 82, one which, as 80, is located at the lower end of the deck and has its upper edge rabbeted, as at 83, to receive the lower ends of the slats 79. The two side members 78 are each pivotally connected with the adjacent frame member 15 near their upper ends, as at 84 (Fig. 1). Stops 85 formed integral with the brackets 52 extend over the side members 78 to limit the rearward movement of the deck about the axis of the pivots 84 and springs 86 are engaged with the deck 25 at its lower end for normally holding the deck in position for the engagement of its side members 78 with the said stops. A convenient arrangement is provided if each of the springs 86 has one of its ends anchored upon the frame member 18. Under these circumstances the other end of each of the springs 86 may extend over the lower cross piece 80 of the deck where it slides under a strap 87 which is mounted upon the said cross piece. While the springs 86 serve to normally hold the deck in position beneath the toothed oscillating bars 26—27 for permitting the movement of relatively small quantities of hay over the deck by said bars, a yielding of the deck away from the said bars for the passage of much larger quantities of hay over the same, is permitted. In the form of construction illustrated in Fig. 11 a spring 88 may be extended between each of the crank arms 49 and the corresponding pitman 59 or 60 to serve the same purpose as the springs shown at 58 in Figs. 1 to 3, and in Figs. 8, 9 and 10.

I claim as my invention:

1. In a hay loader, in combination, a frame having a forwardly and upwardly inclined deck, a carrying wheel located in front of the lower end of the deck, a raking and elevating bar movable over the deck and in rear of its lower end, a crank concentric with the carrying wheel, a link connecting the crank with the lower end of the raking and elevating bar, a pair of other cranks pivoted to the frame one above and one below the said link, respectively, and a second link connected to the free ends of the two last-mentioned cranks and to the first mentioned link.

2. In a harvesting machine, in combination, a traveling frame, a crank turned by the travel of the frame, an oscillating rake, a link connecting the crank and rake, a pair of other cranks pivoted to the frame upon opposite sides of the said link, and a second link connected to the free ends of the two last-mentioned cranks and to the first-mention link.

3. In a harvesting machine, in combination, a traveling frame, a crank turned in a vertical plane by the travel of the frame, an oscillating rake, two other cranks pivoted to the frame at different levels to swing in vertical planes, a link connecting the free ends of the two last-mentioned cranks, a second link connecting the first-mentioned link and the rake, and means actuated by the turning of the first-mentioned crank for swinging the second-mentioned link and the two second-mentioned cranks.

4. In a harvesting machine, in combination, a traveling frame, a crank turned by the travel of the frame, a pair of other cranks pivotally mounted in the frame, the movements of all of the said cranks being in vertical planes parallel to the direction of travel of the frame, an oscillating rake, a link connected to the rake, a second link connected to both of the second-mentioned cranks and to the first-mentioned link, and means actuated by the turning of the first-mentioned crank for swinging both of the said links.

5. In a hay loader, in combination, a frame having a forwardly and upwardly inclined deck, a carrying wheel located in front of the lower end of the deck, a raking and elevating bar movable over the deck and in rear of its lower end, a crank concentric with the carrying wheel, a link connecting the crank with the lower end of the raking and elevating bar, a pair of other cranks pivoted to the frame above and below the said link, respectively, and a second link connected at one end to the upper one of the said pair of cranks and intermediate its ends to the lower one of the said pair of cranks, the other end of the second-mentioned link being connected to the first-mentioned link intermediate the ends of the said first-mentioned link.

6. In a hay loader, in combination, a traveling frame having a forwardly and upwardly inclined deck, a plurality of parallel rake bars movable over the deck and in rear of its lower end, a cross-piece connecting all of the said rake bars intermediate their ends, a pair of actuating links, one at each side of the traveling frame adjacent the lower end of the deck, an inverted U-shaped frame supported in a substantially vertical plane and arching over all of the said rake bars adjacent their lower ends, the ends of the U-shaped frame being connected with the said actuating links, other links extending between the actuating links and the ends of the said cross-piece, a supporting strap extending between the cross member of the said U-shaped frame and the lower end of each of the said rake bars and means guidedly supporting the rake bars in line with the said cross piece.

7. In a hay loader, in combination, a forwardly and upwardly inclined traveling frame, a rigid deck extending substantially the full length of the inclined frame and pivotally connected with the frame at its upper end to swing on a horizontal transverse axis, means yieldingly supporting the other end of the deck in the lower end of the frame, elevating means movable over the deck and gathering means operating in rear of the lower end of the deck.

8. In a hay loader, in combination, a traveling frame having forwardly and upwardly inclined side members and a cross-piece extending horizontally between the side members at their lower ends, a rigid deck located between the side members of the frame and extending substantially throughout the full length of the frame, a pair of alined transverse pivots each connecting the deck with one of the side members of the frame at their upper ends, a spring support anchored upon the said cross-piece of the frame and engaging the lower end of the deck, elevating means movable over the deck, and gathering means operating in rear of the lower end of the deck.

9. In a hay loader, in combination, a traveling frame having a forwardly and upwardly inclined deck, two sets of parallel oscillating rake bars moving longitudinally over the deck, the rake bars of each set alternating with those of the other set, a cross piece connecting the rake bars of one set adjacent their upper ends, a cross piece connecting the rake bars of the other set intermediate their ends, means guidedly supporting the rake bars of each set in line with the corresponding cross piece and gathering means operating in rear of the lower end of the deck.

10. In a hay loader, in combination, a traveling frame having a forwardly and upwardly inclined deck, two sets of oscillating rake bars moving longitudinally over the deck, the rake bars of each set alternating with those of the other set, cross pieces connecting the rake bars of the two sets at different levels, means guidedly supporting the rake bars of each set in line with the corresponding cross piece and gathering means operating in rear of the lower end of the deck.

11. In a hay loader, in combination, a frame having a forwardly and upwardly inclined deck, a carrying wheel located in front of the lower end of the deck, a raking and elevating bar movable over the deck and in rear of its lower end, a crank concentric with the carrying wheel, a link connecting the crank with the lower end of the raking and elevating bar, a pair of other cranks pivoted to the frame one above and one below the said link, respectively, a second link connected to the free ends of the two last mentioned cranks and to the first mentioned link, and a spring extending between the two links, one end of the spring being attached to the first mentioned link in rear of the point of connection of the two links and the other end of the spring being attached to the said second link, above the point of connection of the two links.

12. In a harvesting machine, in combination, a traveling frame, a crank turned by the travel of the frame, an oscillating rake, a link connecting the crank and rake, a pair of other cranks pivoted to the frame upon opposite sides of the said link, one of the said pair of cranks extending from its pivot to a point beyond the link whereby the free ends of the said two cranks are located upon the same side of the said link, and a second link connected to the free ends of the two last mentioned cranks and to the first mentioned link.

13. In a harvesting machine, in combination, a traveling frame, a crank turned by the travel of the frame, an oscillating rake, a link connecting the crank and rake, a pair of other cranks pivoted to the frame upon opposite sides of the said link, one of the said pair of cranks extending from its pivot to a point beyond the link whereby the free ends of the said two cranks are located upon the same side of the said link, a second link connected to the free ends of the two last mentioned cranks and to the first mentioned link, and a spring extending between the two links, one end of the spring being attached to the first mentioned link beyond the point of connection of the two links from the point of connection of the first mentioned link with the first mentioned crank and the other end of the spring being attached to the second mentioned link at the same side of the first mentioned link with the free ends of the said pair of cranks.

14. In a harvesting machine, in combination, a traveling frame, a crank turned in a vertical plane by the travel of the frame, an oscillating rake, two other cranks pivoted to the frame at different levels to swing in vertical planes, a link connecting the free ends of the two last mentioned cranks, a second link connecting the first mentioned link and the rake, means actuated by the turning of the first mentioned crank for swinging the second mentioned link and the two second mentioned cranks, and a spring extending between the two links, each end of the spring being attached to one of the said links at a distance from the point of connection of the two links.

15. In a harvesting machine, in combination, a traveling frame, a crank turned by the travel of the frame, a pair of other cranks pivotally mounted in the frame, the movements of all of the said cranks being in vertical planes parallel to the direction of travel of the frame, an oscillating rake, a link connected to the rake, a second link connected to both of the second mentioned cranks and to the first mentioned link, means actuated by the turning of the first mentioned crank for swinging both of the said links, and a spring extending between the two links, each end of the spring being attached to one of the said links at a distance from the point of connection of the two links.

16. In a hay loader, in combination, a frame having a forwardly and upwardly inclined deck, a carrying wheel located in front of the lower end of the deck, a raking and elevating bar movable over the deck and in rear of its lower end, a crank concentric with the carrying wheel, a link connecting the crank with the lower end of the raking and elevating bar, a pair of other cranks pivoted to the frame above and below the said link, respectively, a second link connected at one end to the upper one of the said pair of cranks and intermediate its ends to the lower end of the said pair of cranks, the other end of the second mentioned link being connected to the first mentioned link intermediate the ends of the said first mentioned link, and a spring extending between the two links, each end of the spring being attached to one of the said links at a distance from the point of connection of the two links, the point of attachment of the spring with the first mentioned link being in rear of the point of connection of the two links.

17. In a harvesting machine, in combination, a traveling frame, a pair of oppositely disposed cranks turned by the travel of the frame, a pair of oscillating rakes having longitudinal movement with respect to the travel of the frame, a link motion including a plurality of relatively movable elements operatively connecting each of the said cranks with one of the rakes and a spring connecting two of the elements of each link motion which move apart during retrograde movement of the corresponding rake and approach each other during forward movement of the corresponding rake.

18. In a harvesting machine in combination, a traveling frame, a pair of oscillating rakes moving longitudinally with respect to the travel of the frame, the movements of each rake comprising a downward and rearward movement, a horizontal forward movement and an upward movement immediately preceding the said downward and rearward movement, means actuated by the travel of the frame for oscillating the said rakes in alternation, the upward movement of each rake occurring during the latter part of the downward and rearward movement of the other rake, and a spring connected with each rake, each spring being tensioned during the downward and rearward movement of the corresponding rake and being allowed to contract during the horizontal forward movement thereof.

19. In a hay loader, in combination, a traveling frame having a forwardly and upwardly inclined deck, a pair of oscillating inclined raking and elevating bars moving longitudinally over the deck and in rear of its lower end, means actuated by the travel of the frame for oscillating the raking and elevating bars in alternation, and a spring connected with each of the said raking and elevating bars, each spring being tensioned during rearward movement of the corresponding bar and being allowed to contract during forward movement thereof.

20. In a hay loader, in combination, a traveling frame having a forwardly and upwardly inclined deck, a pair of oscillating inclined raking and elevating bars moving longitudinally over the deck and in rear of its lower end, the movements of the lower end of each raking and elevating bar comprising a downward and rearward movement, a horizontal forward movement and an upward movement immediately preceding the said downward and rearward movement, means actuated by the travel of the frame for oscillating the said raking and elevating bars in alternation, the said upward movement of the lower end of each bar occurring during the latter part of the downward and rearward movement of the other bar, and a spring connected with each of the raking and elevating bars, each spring being tensioned during downward and rearward movement of the corresponding bar and being allowed to contract during the horizontal forward movement thereof.

21. In a hay loader, in combination, an oscillating bar, a toothed rake head transversely mounted at one end of the bar and pivoted thereto to permit folding of the head toward the bar, there being a plurality of the rake teeth at each side of the bar, and a pair of spring arms extending obliquely between the bar and the rake head, to return the rake head to raking position after folding, the point of engagement of each spring arm with the rake head being beyond a plurality of the rake teeth from the bar whereby the spring arms also provide a hay guard at the top of the rake head.

ERNEST C. SMITH.

Copies of this patent may be obtained for five cents each, by addressing the "Commissioner of Patents, Washington, D. C."